US006993290B1

(12) United States Patent
Gebis et al.

(10) Patent No.: US 6,993,290 B1
(45) Date of Patent: Jan. 31, 2006

(54) PORTABLE PERSONAL RADIO SYSTEM AND METHOD

(75) Inventors: Joseph Gebis, Berkeley, CA (US); Qi Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,923

(22) Filed: Feb. 11, 2000

(51) Int. Cl.
*H04B 7/00* (2006.01)

(52) U.S. Cl. ....................... 455/45; 455/4.2; 455/186.1

(58) Field of Classification Search ................ 455/414, 455/32.1, 433–434, 445, 461, 466, 426, 517, 455/554, 45–46, 4.1–4.2, 186.1, 186.2, 5.1, 455/6.3, 62.1, 150.1, 151.1, 507, 524–525, 455/152.1, 41.4; 370/310–313, 349–352, 370/401; 709/206–207, 217–218, 227; 348/6–7
See application file for complete search history.

(56) References Cited

U.S. PATENT DOCUMENTS

| | | | | | |
|---|---|---|---|---|---|
| 3,716,848 | A | | 2/1973 | Schonholtz et al. | |
| 5,045,327 | A | | 9/1991 | Tarlow et al. | |
| 5,153,579 | A | | 10/1992 | Fisch et al. | |
| 5,307,059 | A | | 4/1994 | Connary et al. | |
| 5,491,838 | A | * | 2/1996 | Takahisa et al. | 455/3.06 |
| 5,504,476 | A | | 4/1996 | Marrs et al. | |
| 5,535,428 | A | | 7/1996 | King et al. | |
| 5,604,487 | A | | 2/1997 | Frymier | |
| 5,623,490 | A | | 4/1997 | Richter | |
| 5,696,500 | A | | 12/1997 | Diem | |
| 5,701,580 | A | | 12/1997 | Yamane et al. | |
| 5,703,794 | A | | 12/1997 | Heddle et al. | |
| 5,705,995 | A | | 1/1998 | Laflin et al. | |
| 5,819,160 | A | * | 10/1998 | Foladare et al. | 455/45 |
| 5,974,447 | A | * | 10/1999 | Cannon et al. | 709/206 |
| 6,041,045 | A | * | 3/2000 | Alterman et al. | 370/313 |
| 6,317,594 | B1 | * | 11/2001 | Gossman et al. | 455/414 |
| 6,418,138 | B1 | * | 7/2002 | Cerf et al. | 370/352 |
| 6,505,046 | B1 | * | 1/2003 | Baker | 455/456.3 |
| 2002/0034956 | A1 | * | 3/2002 | Mekuria | 455/466 |

OTHER PUBLICATIONS

"Personal Digital Radio Service", IBM Technical Disclosure Bulletin, vol. 38, No. 8, Aug. 1995, pp. 315-316.
US 5,715,404, 02/1998, Katseff et al. (withdrawn)

* cited by examiner

*Primary Examiner*—Pablo N. Tran
(74) *Attorney, Agent, or Firm*—Jose Gutman; Fleit, Kain, Gibbons, Gutman, Bongini & Bianco P.L.

(57) ABSTRACT

An information handling system includes a content database for storing content, a receiver for receiving information relating to a subscriber personal profile including subscriber content preferences, a text-to-audio converter coupled to the database for converting textual content to audio content, a content controller for selecting and mixing content from the content database according to the content preferences, a modulator coupled to the text-to-audio converter for modulating audio content to provide audio-modulated signals, and a transmitter coupled to the database for transmitting the content to a remote subscriber unit via a wireless link.

36 Claims, 2 Drawing Sheets

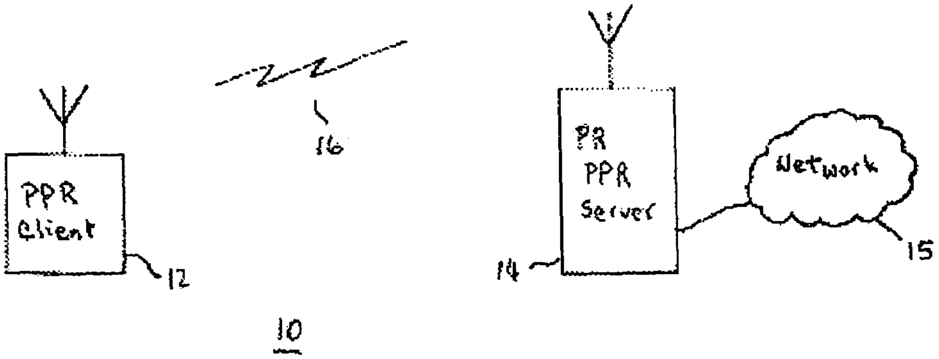
FIG. 1
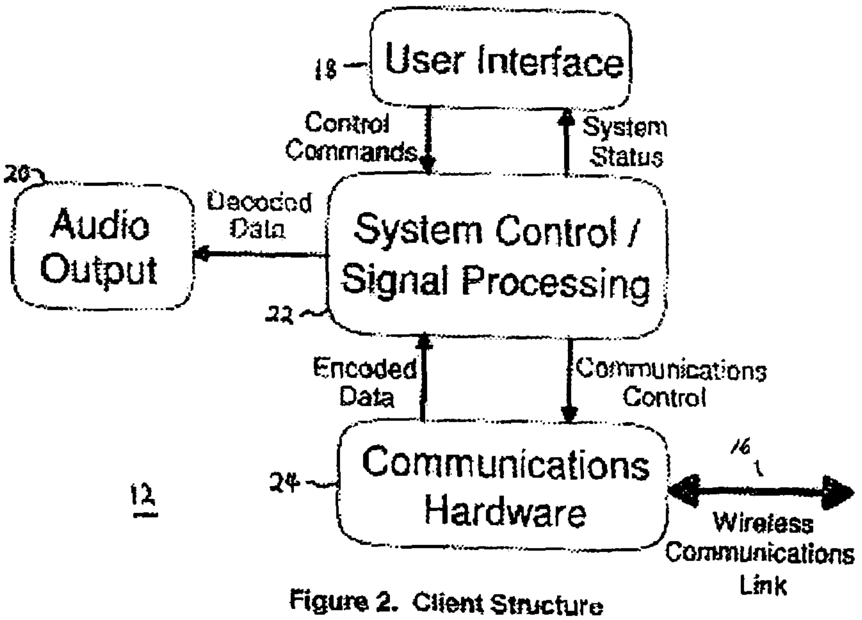
Figure 2. Client Structure

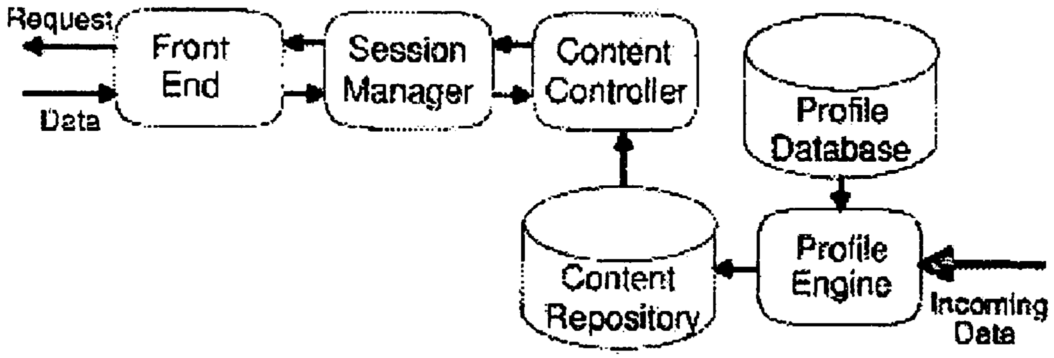
Figure 3. Server Structure
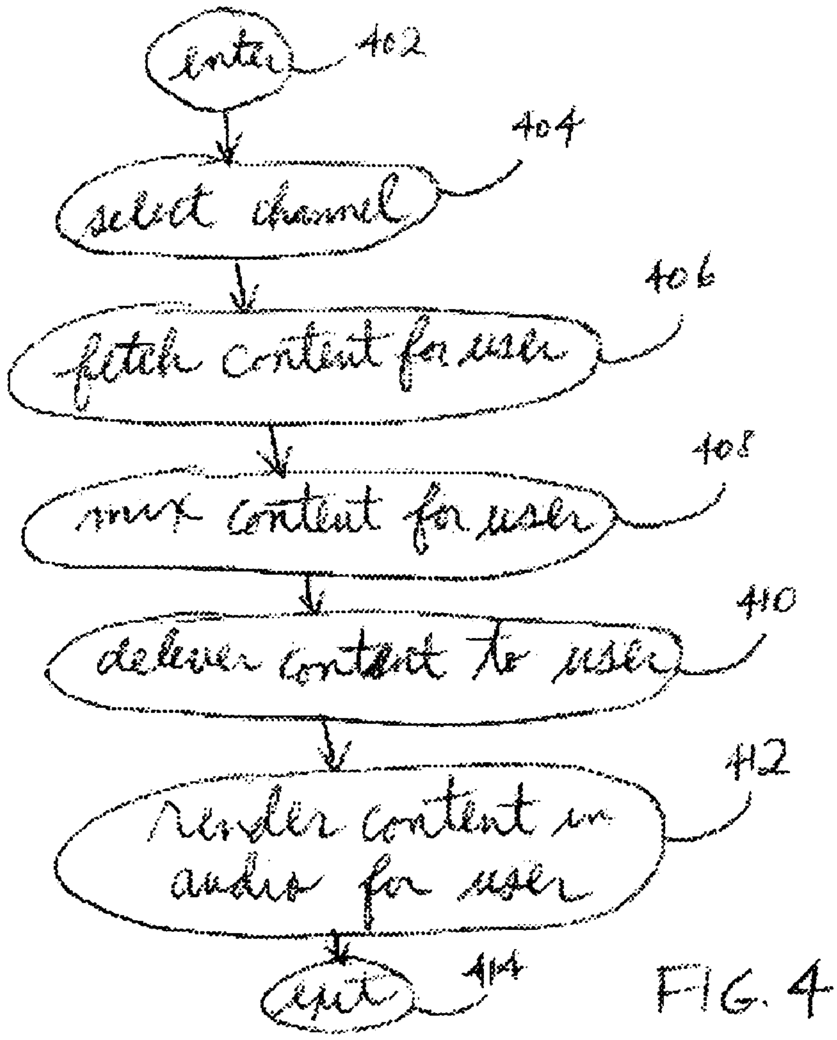
FIG. 4

PORTABLE PERSONAL RADIO SYSTEM AND METHOD

BACKGROUND OF THE INVENTION

1. Field of the Invention

The invention disclosed broadly relates to the field of digital communications and content distribution, and more particularly relates to the field of personal digital wireless communications.

2. Description of the Prior Art

Currently, there are two major driving forces in the computer and communication industries. The first is the proliferation of digital content and its fast growing impact on every corner of human society as evidenced by the Internet. The second is the increasingly pervasive communication infrastructure that is capable of delivering information to the users no matter where they are located. Wireless communication today are allowing individuals to conveniently communicate with one another, such as via cellular telephones and paging devices, anytime and anywhere. However, most persons today access the digital world and the Internet by means of their computers at home or at work.

Accordingly, there is a need for a personal communication system wherein users can receive digital content of their choosing and anywhere they go.

SUMMARY OF THE INVENTION

In one preferred embodiment of the present invention, an information handling system delivers content to a remotely located subscriber unit. The system includes a content database for storing content, a receiver for receiving information relating to a subscriber personal profile comprising subscriber content preferences, a text-to-audio converter coupled to the database for converting textual content to audio content, a content controller for selecting content from the content database according to the content preferences, a modulator coupled to the text-to-audio converter for modulating audio content to provide audio-modulated signals, and a transmitter coupled to the database for transmitting the content to a remote subscriber unit via a wireless link.

BRIEF DESCRIPTION OF THE DRAWINGS

FIG. 1 is an illustration of a client-server radio communication system according to a preferred embodiment of the present invention.

FIG. 2 shows a block diagram illustrating a structure for a client radio system according to a preferred embodiment of the present invention.

FIG. 3 is a block diagram illustrating a structure for a server radio unit according to a preferred embodiment of the present invention.

FIG. 4 is a flow diagram illustrating an exemplary operational sequence for the client-server radio communication system of FIG. 1 in accordance with a preferred embodiment of the present invention.

DESCRIPTION OF THE PREFERRED EMBODIMENT

Referring to FIG. 1, there is shown a new portable personal radio (PPR) system 10 for mobile users. Like a regular radio, a PPR allows a user to listen to audio information transmitted through wireless communication. Unlike a regular radio where the same information is broadcast to every listener to the same station, a PPR allows users to listen to audio information that is pertaining to their own personal interests. For example, a commuter driver can listen to the stock quotes of his/per portfolio, the sports score of his/her favorite teams, the traffic report of his/her commute route, the weather forecast of his/her areas, music, audio book, and news of his/her interest.

The unprecedented capabilities enabled by PPR were made possible by a novel combination of the following four main underlying technologies: automatic personalized selection of digital content from the Internet, mobile wireless communication, audio rendering of selected content, and channel mixing. The Internet has evolved into a vast reservoir of digital information. The main goal of this invention is to make such information accessible to mobile users to satisfy their own personal needs. Wireless communication provides the infrastructure for transmitting the information to the mobile users, while audio rendition provide the most convenient way of accessing information in a mobile environment such as driving an automobile, shopping in a mall, and biking on a trail. Channel mixing allows different types of information, such as a song and stock quotes, to both be delivered to the user in a useful way.

The overall architecture of the PPR system 10 comprises three main components: a PPR client 12, a PPR server 14, and the wireless communication link 16 between the two. Notice that the actual deployment of the system will involve a large number of PPR clients used by mobile users, and at least one and possibly multiple PPR servers 14. The server 14 is coupled to a network 15 (e.g., the Internet) so that it can tap into the vast resources of the Internet. However, the server 14 also hosts it own content.

Referring to FIG. 2, there is shown a client structure for the client unit 12. The PPR client 12 is the mobile part of PPR system 10 that receives audio information from a stationary server 14. The main function of a client 12 includes establishing communication with the server 14, receiving digital content from the server 14, and playing the received in audio form to the user(s). It provides a user interface 18 that is similar to a normal radio where the user can turn the client device 12 on and off, select channels (stations), change volumes, etc. The content played by the client is based on the user subscription and pertains only to the user's personal interests. The client unit 12 also includes an audio output 20 (e.g., a speaker) for presenting an audio version of the content to its user.

The PPR client 12 also comprises the following main blocks: the communication hardware (CH) block 24, the system control/signal processing (SCSP) block 22.

The server 14 is responsible for accepting client connection requests, retrieving information that satisfies the corresponding user's subscription. The server is also responsible for collecting information from a variety of data sources from the Internet or publishing and other broadcasting media and organizing them to enable speedy access by the users based on their subscription.

The wireless communication link between the client and the server can employ a variety of existing wireless transmission mechanisms such as digital or analog cellular communication link, paging communication link, radio communication link, satellite communication link, and other forms of wireless communication links. The key is to establish a sustained connection upon which a stream of digital content can be transmitted from the server to the client so that it can continuously present the information in audio form to the users.

This architecture does not necessarily require the server to transmit audio data directly to the client. It is feasible, and preferable in many situations, for the server 14 to send textual data to the client, which in turn transforms the received data into audio and presents it to the users. Therefore, the design of this architecture allows multiple types of data to be transmitted from the server to the client. It also allows a wide spectrum of processing power of the client, from a simple message received with speakers to a system consisting of powerful data processing power to process and transform received data into high quality audio on the client. The benefit of such a design is that it allows staged and gradual entry of the PPR technology as en emerging business. Providers of the PPR technology can offer low-end and economic PPR client with sufficient personalized audio programming while leaving room for moving towards high-end offering of high quality personal audio programming for mobile users.

A fundamental difference between a PPR and a conventional radio is that the programs played by the PPR satisfy the user's personal interests. The key is that a user must subscribe to the PPR server system and identify the kind of information he/she is interested in. According to one embodiment, the user can use a desktop computer system to connect to the subscription service (e.g., a Web site) to subscribe to a list of channels offered by the PPR server. For each subscribed channel, the user specifies filters to personalize the content of each channel. For example, in the stock channel, the user can provide a list of stock symbols that he/she is interested in and the PPR system 10 will only play the stock quotes or information for those listed symbols. Essentially, the user can specify a personal interest profile to the PPR system 10 which will be used to filter all the content available on the server 14 to only provide the information satisfying the specified interests. Note that users can update their profiles anytime they want and it is also possible that the PPR client unit 12 provides the facility for the users to specify or update their subscriptions.

PPR also allows personalized channel mixing. This allows the user to specify the way that information from different sources is combined when it is delivered. One form of channel mixing is alert mixing the user is able to specify that updates of a certain type (for example, sports scores, traffic or weather that will affect the user, or large changes in the user's stock values) would be able to interrupt the default channel the user is listening to (for example, a music channel). This allows the user to derive the benefit of listening to personalized information channels, but permits the user to listen and to automatically switch back to another channel when there is not a crucial information update. Another form of channel mixing is constant mixing the user is able to specify that multiple sources of information both be played (for example, sports game highlights and a music channel). These sources can both be mixed to every speaker, or different sources could be sent to different speakers (for example, one source is played on the front speakers, and another is played on the rear speakers). Alert mixing is similar to severe weather warnings on televisions (except that the sources and frequency of updates is specified by the user), and constant mixing is somewhat similar to picture-in-picture on televisions.

Referring again to FIG. 2, the CH block 24 is responsible for client-side communications. It has the hardware to establish and support the wireless connection to the server 14, and, in certain preferred arrangements, is able to send information back to the server 14 as well as receive the data sent from the server in a wireless fashion. However, it is not necessary that information be sent back to the server in accordance with a preferred embodiment of the present invention. The hardware used for this purpose can be any conventional radio frequency circuitry adapted to handle digital data. The CH block 24 interacts with the SCSP block 22.

The SCSP block 22 is responsible for system control as well as for decoding the received data to an audio signal. It comprises a digital signal processor (DSP) that is capable of executing basic system control operations as well as transforming the encoded data from the data receiving block 24 to an audio signal. The SCSP 22 block interfaces with all the other blocks.

The user interface 18 is the block that the user interacts with. This block contains the portable controls and information feedback systems that are part of the client unit 12. It interfaces with the SCSP block 22 to determine what system operations need to be performed. The user interface 18 can include various interface devices such as a display and a keyboard.

The audio output block 20 can comprise at least one speaker and/or headphones. This block 20 is responsible for producing the signal that is suitable for sending to speakers. This block may perform such duties as amplifying the decoded audio signal, or interfacing to an existing audio system.

A communications channel needs to be established when data is to be downloaded to the client unit 12 or information (such as channel selection) is to be uploaded to the server 14. There are several reasons that this may occur, including starting the system and changing channels.

The data receiving block is responsible for starting the communications channel. The communications device contains hardware that is capable of supporting a wireless communications channel. Possible examples of acceptable hardware include a cellular phone with a separate or integrated cellular modem (that translates the digital signal into an analog signal capable of being sent over the regular cellular voice network), a cellular digital packet data (CPDP) capable phone, or a wireless data radio. The communications device initiates the call in various ways depending on the hardware. In each of these methods, a standard modem interface is presented to the SCSP block.

Once a communication channel is established, in one preferred embodiment of the present invention, the client identifies itself to the server. Requests are sent from the client to the server and responses, in the form of control messages or data, are sent back. Requests may consist of actions such as changing channels, starting or stopping data flow, and ending a session.

The data that is sent depends on which form of PPR is being used. For a server-rendered system, the data will be a digitally-encoded audio signal (possibly encoded); for a client-rendered system, the data will be unique identifiers (possibly encoded). The data received from the server 14 is buffered. When data is received, it is placed in a small block of memory before it is actually played. This provides two main benefits: graceful handling of cell block handoff, and noise interruption reduction.

When a new stream of data is sent from the server 14 (either when the system first starts or when the channel is changed), data is received as quickly as possible to be placed in the buffer. Once the buffer is full, an equilibrium state is reached by reducing the rate that new data is accepted so that a constant amount of data remains in the buffer. On a cell block handoff or momentary interruption in service, data continues to be taken from the buffer. If the buffer empties before the interruption is finished, sound will be disrupted; but if the interruption is finished before the buffer empties, it can be refilled and there will be no disruption in service.

The user selects the channel. The user interface block 18 presents a selection interface to the user (possibly integrated into a normal AM/FM car radio, or possibly as a separate device). The interface 18 may include a set of buttons that correspond to previously programmed channels that select the channel that is to be used. When a channel is selected, the user interface block 18 communicates this to the signal processing block 22 which then sends a control signal back to the server 14, which then determines which filter the chosen channel corresponds to, installs this filter, and sends back the new results to the client.

Audio rendering is the process of transforming an encoded signal into an audio signal. Client side rendering can be of various forms with different amounts of decoding required. The specific rendering that is used can be chosen depending on how the system is used (e.g., as a simple digital to analog audio decoder, or as a more complex decompression system).

The simplest form of rendering is simply to transform an incoming raw digital audio signal (for example, an 8 kHz, 8-bit mono data stream) into its analog format; this can be achieved with a simple digital/analog (D/A) converter. A more complex decoding scheme may involve a form of audio decompression, such as taking an MPEG-encoded data stream and producing its corresponding analog signal. In these cases, the actual audio rendering is performed on the server, and the result is sent to the client.

Another form of rendering does not involve an audio signal (either raw or encoded) being sent to the client. Instead, values indicating specific predetermined audio sequences are sent. These sequences could be an ASCII stream representing certain audio sequence names, or an encoded version of this. This form of rendering requires that the audio sequences are available on the client. This could be achieved by either pre-encoding specific audio sequences in a ROM, or by downloading audio signals to RAM (either as a synchronization operation performed by the user as a specific synchronization event, or on-demand as new audio sequences are required by the audio stream). The rendering then involves selecting the appropriate audio sequence, decoding the sequence (if applicable), and then transforming it through a D/A converter. In this form, the actual audio rendering is performed on the client.

The PPR server 14 gathers a variety of digital content from multiple data sources on the Internet and also from existing publishing and broadcasting media and makes them available for PPR users to listen to.

Referring to FIG. 3, there is shown a possible structure for a server 14. The PPR server 14 comprises the following main components. A front end 30 that handles client requests for receiving information satisfying the corresponding user's personal profile. A session content manager 32 that is responsible for organizing, converting if necessary various forms of data into audio forms, and packing (mixing) various data into cohesive sequences of audio to be transmitted to the client. A content controller 34 is coupled to a content repository 36 for processing the content stored therein. A profile engine 38 receives incoming data (e.g., from the Internet) and stores it in the content repository 36 according to user profiles stored in the profile database 40. The profile front end that accepts user subscription or updates to existing user profiles. The profile database 40 stores all the user subscription and personal profiles. The profile engine (or backend) 38 gathers and accepts data from a variety of digital data sources from the Internet or publishing and broadcast media. Such data includes news, stock quotes, traffic report, weather forecast, sports scores and highlights, audio books, audio recording of public speeches or school classes, music, natural sounds, etc. The information can be collected by the backend 38 from sources such as Web servers, databases, and file systems. It can also be supplied by media providers such as radio stations, TV stations, newspaper and magazines. The main responsibility of the server 14 front end 30 is communicating with the clients. There are several key mechanisms involved. The first important mechanism is responding to client request. When a PPR client sends out a request to establish a connection with the server 14, the front end 30 must process the request and create the connection after certain information has been verified. The other kind of request coming from a client is selecting content channels after a connection has already been created. The front end 30 must adjust the internal content selection and transmission process so that only information in the selected channel satisfying the user profile will be processed.

The specific mechanisms for accepting a connection request can take different forms depending on the wireless communication mechanisms employed. For example, the basic communication mechanisms may be through cellular phone (digital or analog), and then the server front end 30 would preferably be equipped with a dial-up server that accepts the call from the wireless modem embedded in the client and establishes a connection between the server 14 and the client. The specific mechanisms for selecting channels can be implemented by having the client sending specific data that can be interpreted by the front end 30 as commands for selecting from all the channels subscribed by the corresponding user. The front end 30 communicates with the content manager 34 to select and transmit content from the new channel.

There are two major design choices in transmitting content from the server to the client. The first choice is transmitting text information about certain content in channels such as stock quotes, sports scores, etc. And have the client to perform the necessary computation to convert the text into audio data and display it to the user. The second choice is only transmitting audio data from the server to the client.

The main benefits of the first approach are twofold. First, conveying the same amount of information, text typically requires much smaller space (and smaller transmission bandwidth) than audio. This means less volume needs to be transmitted from the client. In a mobile environment, this can be very significant because of the limited communication bandwidth. The other advantage is that this approach is more scaleable because no state needs to be maintained on the server. Once a channel is selected, the server can simply transmit all the data that belongs to the channel in text form to the client. The client can then use its location computing facility to convert the transmitted text information into audio representation.

A differentiating feature of a PPR system is its ability to use audio to present information pertaining an individual user's personal interests. Content personalization, a critical step for selecting information based on the user interest profile is one of the centerpieces of PPR.

The first part of content personalization is allowing the users to specify their interests to the PPR system. The PPR system provides a hierarchical list of content channels for the users to choose from. When subscribing to any channel, the user has the opportunity to specify a filter for that channel. For example, when subscribing to the stock channel, the user to select stock quotes and related investment information about a list of companies that he/she is interested in. Such specification can be done by supplying a list of company names. Conceptually, a user profile can always be represented by a conjunctive normal Boolean expression, where each clause corresponds to one subscribed channel and any content selection is specified by certain predicates. Such predicates can specify keywords requirement for those digital content where textual description is available. For example, in a music channel, each audio file is associated with a short textual description about the composer, performer, historical background, etc. Therefore, a user can subscribe to that channel while, for example, requiring Beethoven be the composer using a Composer(Beethoven) predicate, effectively selecting all music written by Beethoven. There can be other predicates that require the content to posses certain features without using textual description. For example, one of the features of a music audio file can be with voice, which can be detected by extracting certain features from the audio waveform. By using a corresponding predicate, the users can subscribe to the music channel and select all piano works from Beethoven. Similarly, subscribing to the stock channel can use the Company(e.g., IBM) predicate to select information about IBM.

Where to provide the specific mechanisms and user interface for specifying profile can differ from different embodiment of the system. For example, the PPR system can provide an on-line personalization interface using computers for registered users. It can also equip the necessary mechanisms into the PPR client so that the users can specify and update their personal profiles on the move. The main design tradeoff on where to perform personalization, on a desktop computer, or on a PPR client, depends considerations of the cost and target market. Specifying profiles on a computer is a lot easier to do, but it limits the PPR users to those who already have computers. On the other hand, specifying profiles on the PPR client has wider customer based, but it will likely increase the cost of the system.

As generally illustrated in the flow diagram of FIG. 4, a process of selecting the content for the users based on their profile is evaluating the boolean expressions of user profiles against any new and updated digital content that is available. This means that any content selection predicate, whether it requires certain keyword patterns be satisfied for textual content or textual part of a digital content (e.g. music with a description), or it requires certain non-textual features such as those containing human voice in an audio file, will be evaluated to True or False by any content. The system just needs to perform such Boolean evaluation for every incoming data on every user profiles for each subscribed channels, at steps 402, 404, and 406.

Conceptually, each digital content can be represented by a list of (attribute, value) pairs. Each content selection predicates can be evaluated to True of False using the value of some attributes. For example, a music audio file will have attributes such as those containing human voice, text description, containing piano, etc. The process of matching profiles with content is simply checking whether the value of some attributes satisfies the user requests specified in their profile. For example, digital content about a stock quote will have the following attribute and value list: (stock-name IBM) (current-value 102) (day-high 103) (day-low 100). A digital content of a sports score will have (game Major-League-Baseball) (teams "SF Giants and LA Dodgers") (score "SF-5 LA-4"). With digital audio files we can represent data using attribute lists such as (type audio)(description "Clinton press conference") (format WAV) (data client-.wav) (length "20 minutes"), or, (type audio)(description "classical music") (composer "Mozart") (title "piano concerto") (pianist "Peter Serkin") (orchestra "Boston") (conductor "Ozawa"). All these attribute values can be used for profile matching and personal content selection purposes. For example, a user subscribed to a music channel should be able to select and listen all classical music composed by Beethoven. A user subscribed to a public speech channel can listen to all White House or Congressional press conferences etc. Of course, a user subscribed to a stock or sports channel can choose his/her own favorite stocks and teams.

It is important to know that this invention does not preclude any form of digital content from being presented in PPR to the users using the audio media. Therefore, there is an important concept for content management part of the PPR system. We use the term native format to indicate the type of the document, which can include text, HTML page, Java program, audio WAV file, image, spreadsheet, etc. On the other hand, there is the concept of presentation format, which is the audio format used for playing audio to the users in PPR. Our design does not assume any particular format for representing audio in the PPR system. There is, however, a critical process of converting a digital document from its native format into its presentation format.

For audio files that are stored using the format that is used by PPR to play audio, the conversion is not needed as the data can be directly played. For native types other than the audio format used by PPR, there must be a conversion process. This process can be very different for different native formats, and technically can present different forms of challenges. For example, converting the content of a stock quote into audio form is not too difficult. However, converting a piece of Java code or an image into some audio representation will be very challenging.

Within the framework of content personalization for PPR, the key issue here is to extract useful attributes or salient features from digital documents that can help users to personalize content selection. For text documents, the attribute extraction process has been dealt with in the information retrieval community and there are methods for document summarization and extraction. For audio data, typically there are mechanisms for extracting out key features such as whether the audio is human voice or music. Since digital audio data will become an increasingly important part of the digital cyberspace and a major source of PPR content, there must be mechanisms for the system to extract key features. Our basic approach is to first decide the main types of the audio data. If it is music, we can try to detect what kind of music it might be, does it use a particular instrument such as piano, etc. If the data is human voice, then we can apply the automatic speech recognition technology to extract text information for content personalization purposes.

The most dominant digital content is text. Most of the information we consume on a daily basis is available in text forms such as news, stock quotes etc. As discussed above, content personalization will use the textual information to match against user profiles. When presenting to the user, such textual information will be converted into audio. There are known methods such as using a text-to-speech synthesizer, using prerecorded audio clips and perform table lookup to map words and phrase into those audio clips. For channels such as stock and sports, there is only a fixed set of vocabulary and rigid structure of the each document. Therefore, table lookup to map text segments into prerecorded audio clips will be able to provide more natural quality sound than using a generic speech synthesizer. We will refer to the audio ticker document and other speech synthesize technologies.

The content of a PPR channel may come from many different sources such as original audio files, prerecorded audio clips mapped by table look-up, audio generated by a synthesizer, background music, prelude and postlude (music or speech). It is very important that multiple source of audio data can be packaged (mixed) into a cohesive sequence. The way of packaging can also be exposed to the users for choice. For example, when people listen to a stock channel, they can select what kind of background music to use, whether to provide additional background or other sound when a stock value is below certain figure.

When a user starts to play audio from a PPR client unit 12, information must be continuously transmitted from the server 14 to the client unit 12, and the audio must be played in real time to maintain an audio stream. On the other hand, digital information is being received and collected by the content gatherer at the backend constantly, regardless of whether there are users currently listening to channels or not. Content personalization through profile matching must be done as soon as the data is received. This kind of asynchrony between content collection and personalization, to content displaying to the users means that there must be a buffering mechanism for each user and each of his/her subscribed channels.

Our system architecture uses a large scale digital content repository (not shown) to store all the received data. Incoming data are always first put into the repository and then go through the profile matching process. For each user, there is a separate data area that records all the information that has been matched against his/her personal interests so far. This data can be represented by a file system folder or a database, or a database table. For each channel subscribed to by the user, there is a separate data entity that records all the data that has matched the user's profile and has not yet been consumed by the user. Such data entry can be a file or a database table or other forms. It stores the pointers into the content repository for the corresponding digital documents that belong to the user's subscribe channel.

When a user starts listening to a selected channel, the server must first consult the data entry corresponding to that channel, obtain a list of all the documents matched for that channel, order those documents into a sequence based on certain principles, such as chronological ordering or priority ordering (such as playing the sports score involving the home team first), at steps 402 and 404. The server then, at steps 406 and 408, retrieves (fetches) the actual content from the repository, performs the necessary content conversion and packaging (mixing), and then, at step 410, sends the data through a wireless link to the client. The client then, at steps 412 and 414, plays the content as audio to the user. The content management mechanism on the sever must update the channel's data entry to reflect the content that has already been played, at step 412, so that it won't be repeated when the user switches to other channels or turns off the PPR, and then resumes listening to the channel again.

Note that the content management must also take care of content of different nature in keeping a content with consistent and cohesive content. For example there are certain kinds of digital documents that reflect different value of the same entity. For example, stock quotes get updated every 15 minutes. When the data entry of a channel contains multiple pointers to stock quotes of the same stock of different time of the day, the content manager can decide to only play the most recent stock quotes. It can still make the older stock quotes available, but only when the users ask for it, say "give me the trading value of IBM 30 minutes after the market opened". Therefore, the content management can decide certain policies for overriding, ordering and packing different digital content based on the nature of the content and user preference.

There are several specific messages that are transmitted between the client units and the server. The messages can be split into four broad categories: identification messages that identify and verify the client's identity; session management messages that handle session-specific requests such as changing the channel; profile management messages that affect a user's profile; and audio messages that contain the actual audio information to be delivered to the user.

The first type of messages are identification messages. These messages are responsible for identifying the user to the server, and for verifying that user's identity. When the PPR 12 first connects to the server 14, the server 14 prompts the radio 12 for an identification string. This string allows the server to determine which information to send to the client. The protocol can be a simple trusting identity request scheme, in which no effort is made to verify the user's identity; or it can be a more complicated challenge-request scheme in which the user's identity is verified through the use of a shared key.

Session management messages control requests specific to each session. These include changing the channel, and starting and stopping transmission. Session management messages can be further broken down into two categories: requests and responses.

Once the PPR is identified to the server, a typical session involves first querying the server to determine which channels the user is subscribed to, determining channel status, and then requesting data from an existing channel. Eventually, that channel may be closed and another opened. Finally, the user may turn off the radio and stop the communications. Each of these actions correspond to a session management request message: GetSubscribedChannels( ), GetChannelStatus(ChannelName), and OpenChannel(ChannelName).

When the server receives a session management request, it replies with a message-appropriate for that request. Note that the response may or may not be a session management response; for example, the server responds to a GetSubscribedChannels request with a session management response that includes the channels, and to a GetChannel Status request with a session management response that include the channel status, but the server response to a OpenChannel request with an Audio Message.

Profile management messages change things in the user's profile. These messages allow the user to make changes that will last across sessions. A simple implementation of PPR does not need to have any profile management messages passed to or from the client; any changes to a user's profile can be made using a normal desktop PC through another interface.

Like session management messages, profile management messages can be either requests or responses. Profile management messages include GetAllChannels( ) which gets a list of all channels available on the system), SubscribeChannel(ChannelName, UserProfile), and UnsubscribeChannel (ChannelName). The response to a GetAllChannels request contains all available channels; the response to a SubscribeChannel and UnsubscribeChannel contain a success or failure message.

Audio messages contain the actual audio information to be delivered to the user. This information may be encoded.

The PPR can be integrated with an automobile in two ways. The PPR system could be integrated into the same unit as a car radio: this would present the PPR interface and the normal radio interface as one unified system, but would limit the flexibility for selecting individual PPR and conventional radio systems. The PPR system could also interface to a separate, existing car radio. In this case, the audio signal from the conventional radio can be diverted to the PPR, which would then allow selection between conventional radio operation and PPR operation.

Wireless data communication exists today in a few varied formats that would be suitable for use with PPR. One of these is the use of a cellular modem with a regular cell phone. This translates computer signals into a format that can be transmitted over the cell phone to allow the computer to communicate data by using a regular cell phone. This can be a separate regular phone that allows data input, or it can be dedicated hardware. Another method is the use of a modem that supports one of the digital cellular data protocols, such as CDPD. This allows digital data communications over the cellular network. Finally, a method that does not use the cellular network, such as a radio modem, can be used. All these methods use slightly different hardware but provide the same program interface and functionality to the system.

If the method used to connect was the analog cellular modem, it would be possible for the system to interface to a separate cellular phone. This would allow the PPR to have a lower cost (as the cellular functionality does not have to be included with the system), as well as allow the user to use the cellular phone independently of the PPR system. Such a setup would include a cradle inside the automobile into which users would place a cellular phone when they entered their car.

The methods and system taught herein provide significant advantages over any prior art communication methods and systems. Particularly, the content is normally personalized, gathered, and mixed for a user according to a user profile, it is preferably rendered in audio form for the user, and delivered at least in part over a wireless communication link to allow the user to travel to different locations while being capable of receiving the personalized content.

Although specific embodiments of the invention have been disclosed, it will be understood by those having skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An information handling system, comprising:

a content database for storing content, wherein the content is organized into at least one channel;

means for receiving information relating to a subscriber personal profile comprising subscriber content preferences, wherein the subscriber content preferences comprise preferences for at least one preferred channel within the at least one channel and a specification of a way that content from the at least one preferred channel is combined;

a content controller for selecting content from the at least one preferred channel according to the subscriber content preferences;

means for mixing content from the at least one preferred channel according to the subscriber personal profile comprising subscriber content preferences, wherein the means for mixing content comprise alert mixing means for interrupting information from a default channel with information from a first channel according to the subscriber content preferences;

a modulator for modulating audio content to provide audio-modulated signals; and a transmitter coupled to the content database and to the means for mixing content for transmitting mixed content from the at least one preferred channel to a remote subscriber unit via a wireless link.

2. The system of claim 1, wherein the transmitter is a radio-frequency transmitter.

3. The system of claim 1, wherein the transmitter operates under an analog cellular telephone protocol.

4. The system of claim 1, wherein the transmitter operates under a digital cellular telephone protocol.

5. The system of claim 1 wherein the subscriber content preferences are provided by a user of the remote subscriber unit via the wireless link, thereby identifying personal preferences.

6. The system of claim 1 wherein the subscriber content preferences comprise music.

7. The system of claim 1 wherein the subscriber content preferences comprise information relating to a stock market.

8. The system of claim 1 wherein the subscriber content preferences comprise information relating to sports.

9. The system of claim 1 further comprising personalized channel mixing means for allowing a user of the remote subscriber unit to specify the way that content from the at least one preferred channel is combined when transmitted by the transmitter.

10. An information handling system, comprising:

a content database for storing content, wherein the content is organized into at least one channel;

means for receiving information relating to a subscriber personal profile comprising subscriber content preferences, wherein the subscriber content preferences comprise preferences for at least one preferred channel within the at least one channel;

a content controller for selecting content from the at least one preferred channel according to the subscriber content preferences;

means for mixing content from the at least one preferred channel according to the subscriber personal profile comprising subscriber content preferences;

a modulator for modulating audio content to provide audio-modulated signals;

a transmitter coupled to the content database and to the means for mixing content for transmitting mixed content from the at least one preferred channel to a remote subscriber unit via a wireless link; and personalized channel mixing means for allowing a user of the remote subscriber unit to specify the way that content from the at least one preferred channel is combined when transmitted by the transmitter, wherein the personalized channel mixing means comprise alert mixing means for the user to specify updates of specified information from a first channel to be transmitted by interrupting information from a default channel being transmitted.

11. An information handling system, comprising:

a content database for storing content, wherein the content is organized into at least one channel;

means for receiving information relating to a subscriber personal profile comprising subscriber content preferences, wherein the subscriber content preferences comprise preferences for at least one preferred channel within the at least one channel;

a content controller for selecting content from the at least one preferred channel according to the subscriber content preferences;

means for mixing content from the at least one preferred channel according to the subscriber personal profile comprising subscriber content preferences;

a modulator for modulating audio content to provide audio-modulated signals;

a transmitter coupled to the content database and to the means for mixing content for transmitting mixed content from the at least one preferred channel to a remote subscriber unit via a wireless link; and personalized channel mixing means for allowing a user of the remote subscriber unit to specify the way that content from the at least one preferred channel is combined when transmitted by the transmitter, wherein the personalized channel mixing means comprise constant mixing means for the user to specify that mixed information from multiple channels be transmitted to be played simultaneously at the remote subscriber unit.

12. A method for a personal radio system comprising the steps of:

storing content that is organized into at least one channel;

receiving information relating to a subscriber personal profile comprising subscriber content preferences, wherein the subscriber content preferences comprise preferences for at least one preferred channel within the at least one channel and a specification of a way that content from the at least one preferred channel is combined;

selecting content from the at least one preferred channel according to the subscriber content preferences;

mixing content from the at least one preferred channel into a stream of data according to the subscriber personal profile comprising subscriber content preferences, wherein the mixing content comprises interrupting information from a default channel with information from a first channel according to the subscriber content preferences;

modulating audio content to provide audio-modulated signals; and transmitting the stream of data for receipt by a user unit via a wireless medium for audio rendering to a user of the user unit.

13. The method of claim 12 further comprising converting the content from text to audio and modulating a carrier signal with the audio for transmission to the user.

14. The method of claim 12 further comprising transmitting a radio-frequency signal with the audio to the user.

15. The method of claim 12 further comprising transmitting a signal with the audio using an analog cellular telephone protocol.

16. The method of claim 12 further comprising transmitting a signal with the audio using a digital cellular telephone protocol.

17. The method of claim 12 wherein the subscriber content preferences comprise music.

18. The method of claim 12 wherein the subscriber content preferences comprise information relating to a stock market.

19. The method of claim 12 wherein the subscriber content preferences comprise information relating to sports.

20. The method of claim 12 wherein the at least one channel comprises a plurality of channels and wherein the method further comprises allowing the user to specify the way that the content from the plurality of channels is combined when delivered to the user.

21. The method of claim 20 further comprising allowing the user to specify updates of specified information to be presented to the user by interrupting a default channel being presented to the user.

22. The method of claim 20 further comprising allowing the user to specify that combined information from multiple channels of information be presented simultaneously to the user.

23. A computer-readable medium for a personal radio system comprising the instructions for:

storing content that is organized into at least one channel;

receiving information relating to a subscriber personal profile comprising subscriber content preferences, wherein the subscriber content preferences comprise preferences for at least one preferred channel within the at least one channel and a specification of a way that content from the at least one preferred channel is combined;

selecting content from the at least one preferred channel according to the subscriber content preferences;

mixing content from the at least one preferred channel into a stream of data according to the subscriber personal profile comprising subscriber content preferences, wherein the instructions for mixing content comprises instructions for interrupting information from a default channel with information from a first channel according to the subscriber content preferences;

modulating audio content to provide audio-modulated signals; and transmitting the stream of data for receipt by a user unit via a wireless medium for audio rendering to a user.

24. The medium of claim 23 further comprising instructions for converting the content from text to audio and modulating a carrier signal with the audio for transmission to the user unit.

25. The medium of claim 23 further comprising instructions for transmitting a radio-frequency signal with the audio to the user unit.

26. The medium of claim 23 further comprising instructions for transmitting a signal with the audio using an analog cellular telephone protocol.

27. The medium of claim 23 further comprising instructions for transmitting a signal with the audio using a digital cellular telephone protocol.

28. The medium of claim 23 wherein the subscriber content preferences comprise music.

29. The medium of claim 23 wherein the subscriber content preferences comprise information relating to a stock market.

30. The medium of claim 23 wherein the subscriber content preferences comprise information relating to sports.

31. The medium of claim 23 wherein the at least one channel comprises a plurality of channels and wherein the medium further comprises instructions for allowing the user to specify the way that information from different channels is combined in the transmitted stream of data.

32. The medium of claim 31 further comprising instructions for allowing the user to specify updates of specified information to be presented to the user by interrupting the default channel being presented to the user.

33. The medium of claim 31 further comprising instructions for allowing the user to specify that content from multiple channels of information be presented simultaneously to the user.

34. The system of claim 1, further comprising a client radio system comprising a text-to-audio converter for converting textual content to audio content.

35. The system of claim 11, wherein a subset of the mixed information from multiple channels is sent to one of a plurality of speakers.

36. The method of claim 22, wherein a subset of the combined information from multiple channels is sent to one of a plurality of speakers.

* * * * *